United States Patent [19]

Sato et al.

[11] Patent Number: 4,978,115
[45] Date of Patent: Dec. 18, 1990

[54] AUTOMATIC PAPER FEED DEVICE

[75] Inventors: Siro Sato, Hachioji; Shiro Hatakeyama, Tokyo, both of Japan

[73] Assignee: Konica Corporation, Tokyo, Japan

[21] Appl. No.: 302,174

[22] Filed: Jan. 26, 1989

[30] Foreign Application Priority Data

Jan. 30, 1988 [JP] Japan .................... 63-11715[U]

[51] Int. Cl.$^5$ ................................ B65H 3/56
[52] U.S. Cl. ..................................... 271/124
[58] Field of Search ............................ 271/121, 124

[56] References Cited

U.S. PATENT DOCUMENTS

| | | | |
|---|---|---|---|
| 1,637,833 | 8/1927 | Mueller | 271/124 |
| 3,539,179 | 11/1970 | Bergman | 271/124 |
| 4,222,313 | 9/1980 | Staufner | 271/124 X |
| 4,313,598 | 2/1982 | DiBlasio | 271/124 |
| 4,552,353 | 11/1985 | Tanaka | 271/124 |
| 4,568,074 | 2/1986 | Murayoshi | 271/121 |
| 4,696,462 | 9/1987 | Tanaka | 271/121 X |
| 4,717,137 | 1/1988 | Leuthold | 271/124 X |
| 4,786,040 | 11/1988 | Thomsen | 271/124 X |
| 4,844,437 | 7/1989 | Tanaka | 271/124 |
| 4,858,907 | 8/1989 | Eisner | 271/124 |

Primary Examiner—Richard A. Schacher
Attorney, Agent, or Firm—Finnegan, Henderson, Farabow, Garrett and Dunner

[57] ABSTRACT

An automatic document feed apparatus comprising a separation pad and at least one feed roller which comes into slidable contact with the separation pad. The roller is driven and transports a sheet of document pinched between the roller and the separation pad. This automatic document feed apparatus comprises a handle, thumbscrew or disk for adjusting force to press the roller by the pad.

5 Claims, 8 Drawing Sheets

AUTOMATIC PAPER FEED DEVICE

FIELD OF THE INVENTION

The present invention relates to an automatic paper feed device having a pad pressure adjusting mechanism, which is advantageously applicable to facsimile machines and the like.

BACKGROUND OF THE INVENTION

Facsimile machines for business use or domestic use are generally equipped with automatic paper feed devices.

An automatic paper feed device, as is known to all interested, is designed to feed a number of sheets of documents sheet by sheet automatically, without the help of an operator, to the image-reading means.

Illustrating an automatic paper feed device in the prior art in a drawing in a later section, FIG. 8 shows an example of a conventional automatic paper feed device 30 which is equipped with a pad pressure adjusting mechanism 40.

As shown in FIG. 8, this device 30 has document feed rollers 4 consisting of a plurality of axially arranged roller elements (not illustrated in the drawing). Close to these rollers 4 is placed a guide plate 32 slanted at a certain angle, which controls the direction in which the sheets of documents 19, which are placed on the platen (not shown in the drawing), are forwarded therefrom. The numeral 33 in the drawing indicates a cutout which is opened as shown in the drawing at each of the areas where said document feed rollers 4 are provided.

Said pad pressure adjusting mechanism 40 is provided against the document feed rollers 4 with part of it in slidable contact with the treads of the rollers 4. A pad pressure adjusting means thereof, as is known, consists of a leaf spring 41 of a certain shape, a separating pad 42 attached by adhesion to the underside thereof, and a coil spring 46 provided, as shown in the drawing, between the leaf spring 41 and the main body 45 with said coil spring so designed as to press the separating pad 42 slidably against the treads of said rollers 4 with a set pressure. With such a mechanism, the pad pressure acting upon the document feed rollers 4 is maintained constant at all times.

The leaf spring 41, to which the separating pad 42 is attached, is fixed to a holding member 43 in the main body with a screw 44.

In an automatic paper feed device 30 set up as above, a number of sheets of documents 19 are laid in a layer on the guide plate 32, as shown in the drawing, when the document feed rollers 4 operate, one of the sheets is forwarded at a time by the separating action of the separating pad 42 and each sheet 19 is separately discharged in the direction shown by an arrow in the drawing. Each sheet of documents thus discharged is passed through an image-reading means (not shown in the drawing) whereby the contents (image) on the sheet are photoelectrically read.

Thus in a conventional automatic paper feed device 30 the separating pad 42 and the coil spring 46 jointly enable the document feed rollers 4 to pick each sheet from a number of sheets of documents 19 laid together on the guide plate 32 and send them sheet by sheet downward. The coil spring 46 is designed to maintain the pad pressure uniform at all times.

In such a pad pressure adjusting mechanism 40 based on a coil spring 46 for uniformity of pressure, however, the pad pressure cannot be adjusted to suit variable conditions. The operation, therefore, involves the possibility of not picking a sheet properly depending on the thickness, quality, and the like of the paper 19 used. For example, when the paper 19 used is thinner than in ordinary cases or is lacking in stiffness, a slight increase in pad pressure over the ordinary pressure serves to avoid picking two or more sheets 19 in overlap.

The conventional mechanism 40, furthermore, poses a problem that both the separating pad 42 and the document feed rollers 4 wear through the use over a long period, the pad pressure thus becoming inadequate while they are used for a long time.

Taking the above-mentioned problems into consideration, it is proposed, in accordance with this invention to introduce an automatic paper feed device having a pad pressure adjusting means which enables an operator to adjust the pad pressure according to the thickness, quality, or the like of the paper 19 used relatively easily from the outside of the apparatus.

SUMMARY OF THE INVENTION

The summary of the present invention is explained as follows.

An automatic document feed apparatus, comprising:
(a) a separation pad;
(b) at least one feed roller which comes into slidable contact with the separation pad, the roller being driven and transporting a sheet of document pinched between the roller and the pad; and
(c) means for adjusting force to press the roller by the pad.

The automatic document feed apparatus mentioned above, wherein the pad is backed by a spring and the spring force is adjusted by a cam mechanism.

The automatic document feed apparatus mentioned above, wherein the cam mechanism is automatically operated according to a signal sent from a document paper thickness measure device installed in the automatic document feed apparatus.

As a means to solve said problemes there is provided, in accordance with this invention, a device comprising a separating pad placed against and in slidable contact with the document feed rollers for automatically feeding paper sheets, and a pad pressure adjusting mechanism for adjusting the pad pressure against said document feed rollers, said pad pressure adjusting mechanism being equipped with a pad pressure adjusting means for adjusting the pad pressure from the outside.

Referring to the drawings provided in a later section, the features and advantages of this invention can be summarized as follows.

An automatic paper feed device 30 embodying this invention, as shown in FIG. 3, has a pad pressure adjusting means 60 provided on the outside of the apparatus by control of which the pressure with which the separating pad 42 presses against the document feed rollers 4 can be adjusted.

Therefore, when the paper 19 used is thin or lacking in stiffness, an increase in the pad pressure to an extent appropriate for the occasion, which can be achieved by adjusting said pad pressure adjusting means 60, precludes the possibility of sending two or more paper sheets at a time in overlap.

With said pad pressure adjusting means 60 provided on the exterior, it is very simple to adjust the pad pressure.

BRIEF DESCRIPTION OF THE DRAWINGS

FIG. 3 (B) illustrates the main parts of the means of FIG. 3 (A) as seen from the side of the apparatus.

FIG. 4 (B) is the stationary part with recessions into which the protrusions provided by the adjusting means of FIG. 4 (A) fit, represented in an example planar view.

FIG. 5 (B) represents the adjusting means of FIG. 5 (A) as seen from the head side.

DETAILED DESCRIPTION OF THE PREFERRED EMBODIMENT

Figure 1:
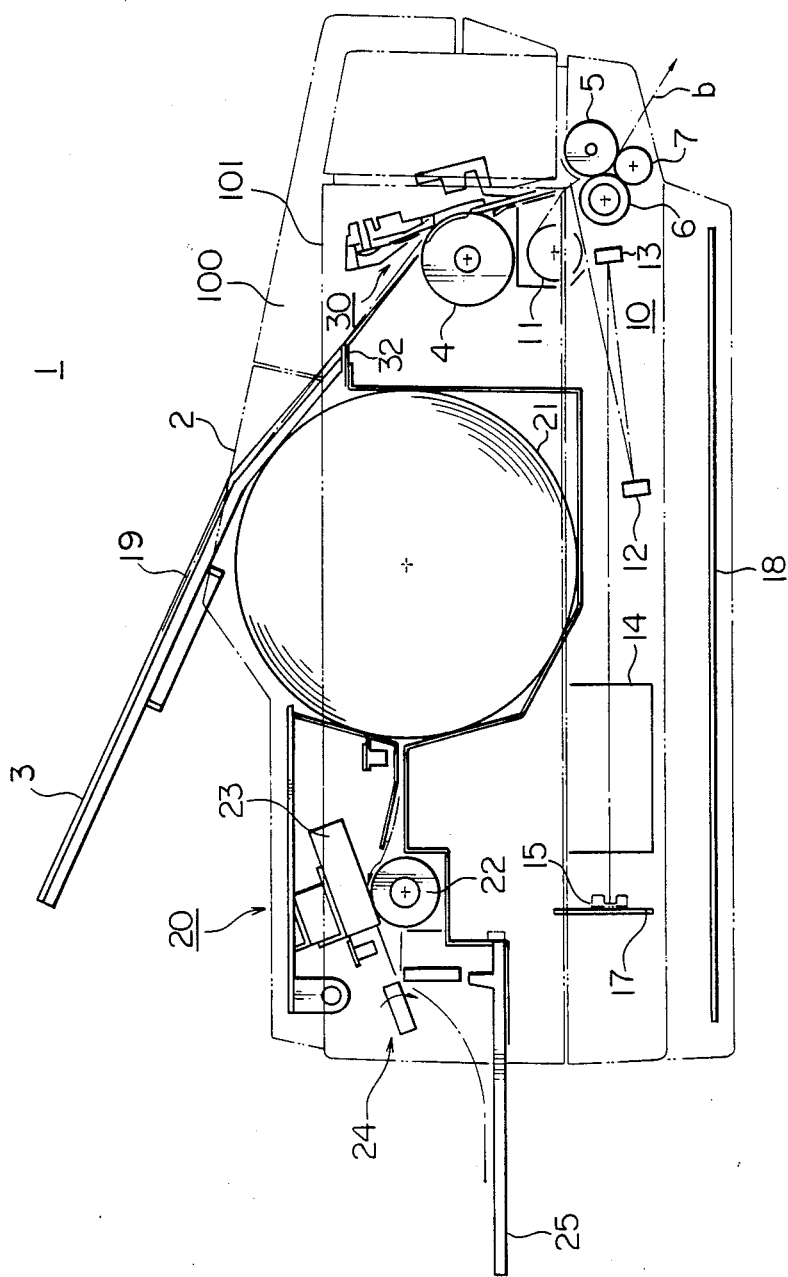
FIG. 1 represents a facsimile machine, to which the present invention can be applied, in an overall schematic side view.

A detailed description of automatic paper feed devices embodying the present invention will now follow in conjunction with the drawings mentioned above, referring to an example of their use in the facsimile machine in the drawing.

FIG. 1 illustrates a facsimile machine, to which the present invention is advantageously applicable, in an overall schematic view. A facsimile machine 1, as is generally known, consists of an optical reading means 10 for reading documents and a recording means 20 for recording on recording paper the image data received, both housed in a casing (main body) 2 in the shape of a rectangular parallelepiped.

The signals of the image read by the optical reading means 10 are transmitted to the communicatee by communication lines.

A message stand 3 is provided over the casing 2 at a slanting position higher at the left and lower at the right in FIG. 1 and the documents, identification sheet, and the like (these shall hereinafter be referred to as "message" unless otherwise specified) placed theron are forwarded to the optical reading means 10.

The messages entered into the casing through a message insertion slit are forwarded downward by document feed rollers 4, and the identification of the form of the paper and the reading of the original images are carried out while they travel to a pair of discharge rollers 5, 6. For these processes, a fluorescent lamp 11 is provided between the document feed rollers 4 and the discharge rollers 5, 6 so as to irradiate the surfaces of the messages with light. The reflected light therefrom (optical image data) is transmitted to the image reading device 15 through reflection by a pair of mirrors 12, 13, and passage through a lens system 14, the mirrors and lens system both disposed at the bottom of the casing 2.

At the image reading device 15, the optical image data are converted to electrical signals, that is to say, image signals. The image signals are stored in a memory through an image processing system (not shown in the drawing) or transmitted to communication lines.

An example of the image reading device 15 is a line sensor conisting of a charge-transfer device such as a CCD. The numeral 17 indicates the base plate to which CCD 15 is fixed.

The messages are forwarded downward at a set rate. As they thus travel, in the example described herein, the image data are read, each line as a unit, and converted successively to image signals.

The messages forwarded downward at a set rate are brought outward by the pair of discharge rollers 5, 6 and discharged from the bottom at the front end of the casing 2 (in FIG. 1) onto a receiving tray (not shown in the drawing).

The facsimile machine in FIG. 1 has its console panel (not shown in the drawing) on the upper front section of the casing 2, where various control keys and indicators are provided.

Said recording means 20 will now be described.

The term "recording means 20" herein refers to a device for represnting the image signals received as visble images on the recording paper by converting the signal data. The facsimile machine in FIG. 1 has its recording means 20 at an upper position at the rear part of the casing 2. The recoding paper 21 for this purpose is provided in a roll held rotatably in the center inside the casing 2 and reeled out toward the platen 22.

The recording means 20 has a recording device 23 which is positioned over said platen 22 and held in slidable contact with its circumferential surface. A linear thermal recording head is an example of a useful recording device 23. Image data received through a communication system are recorded on the recording paper 21 as the recording paper passes the thermal recording head 23 at the upper circumference of the platen 22.

When the recording paper 21 having image data recorded thereon has been forwarded by as set length, an automatic cutter 24 is actuated to cut the recording paper 21 automatically at a backward position. This automatic cutter 24 consists of a blade for cutting the recording paper and an actuating means for the up-and-down movement of the blade (not shown in detail in the drawing). After the cutting, the recording paper 21 separated is discharged onto a tray 25 provided at the rear of the casing 2.

Figure 2:
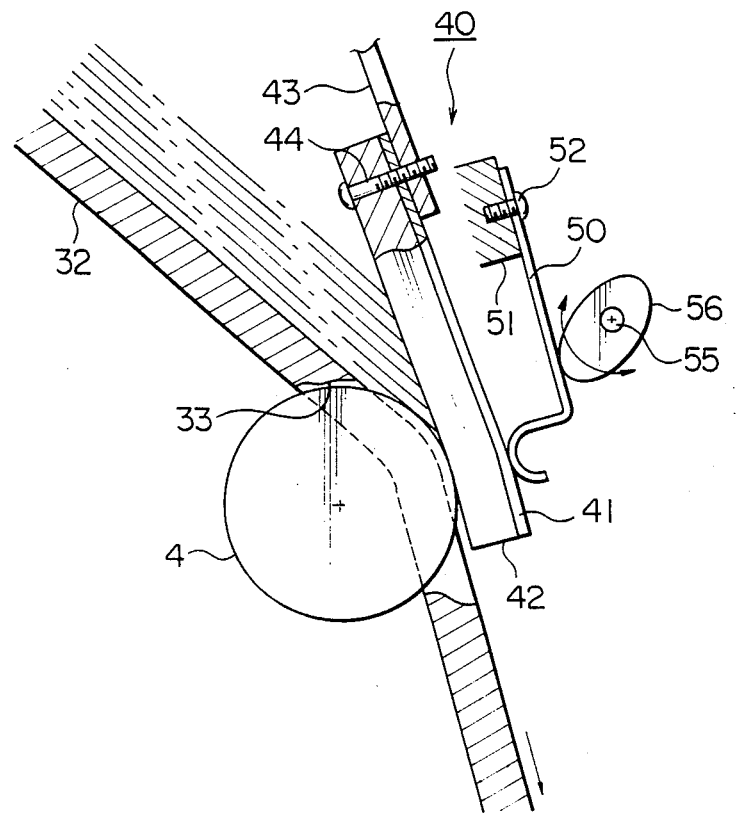
FIG. 2 represents an example of an automatic paper feed apparatus embodying this invention, illustrating its main structure in a side view.

FIG. 2 illusrates an example of an automatic paper feed device 30 which is equipped with a pad pressure adjusting mechanism embodying the present invention. In this device also, there are provided a plurality of document feed rollers 4 and close to these rollers 4 a guide plate 32 slanted at a certain angle, as shown in the drawing. The pad pressure adjusting mechanism 40 is provided facing the treads of the document feed rollers 4 in a setup to pick the outgoing messages 19 sheet by sheet separately.

The pad pressure adjusting mechanism 40, as shown in FIG. 2, has a separating pad 42 of a certain shape and with a certain thickness and a leaf spring 41, to the underside of which the separating pad 42 is attached by adhesion. The leaf spring 41, which holds the separating pad 42, is fixed to the casing 2 by means of a fixing member 43 and a screw 44. The orientation in which the leaf spring 41 is placed relative to that of the document feed rollers 4 when fixed to the casing is one slanted at a certain angle from the direction toward which the document feed rollers 4 draw each sheet of messages 19, as shown in the drawing.

At a certain position facing the leaf spring 41 in this pad pressure adjusting mechanism 40 there is provided a pad pressure adjusting cam 56 which is held rotatably on its axial support 55. The pad pressure adjusting cam 56 is placed in slidable contact with an intermediary spring 50, through which the cam exerts its pressure upon the leaf spring 41.

Said intermediary spring 50 is in the shape of a plate, having one end fixed to a fixing member 51 by means of a screw 52 and the other end loose; the loose end is rounded into the shape of substantially the letter J, as shown in the drawing, and the rounded end is placed in contact with the leaf spring 41.

With the pad pressure adjusting mechanism 40 set up as described above in automatic paper feed device 30, the pressure exerted by the pad pressure adjusting cam 56 upon the intermediary spring 50 changes as the cam is turned in the directions shown by the arrows. Since the pressure thus variously exerted is transmitted to the leaf spring 41, the pad pressure, that is to say, the pressure with which the separating pad 42 presses against the document feed rollers 4, can be changed accordingly.

Since the position in which the pad pressure adjusting cam 56 is placed, for example, as shown in the drawing, determines the pad pressure which acts upon the document feed rollers 4, the pad pressure can be adjusted so as to facilitate the separation of each sheet of messages 19 from the rest as they are forwarded from the message stand in the downward direction and discharged.

Since the pressure with which the pad pressure adjusting cam 56 presses against the intermediary spring 50 is constant, the separating pad 42 presses against the document feed rollers 4 with a uniform pad pressure while the messages are forwarded.

When the paper sheets of messages 19 substantially change in thickness or quality from the preceding ones, this mechanism permits the pad pressure to be adapted to the changes by means of the pad pressure adjusting cam 56.

Figure 3A:
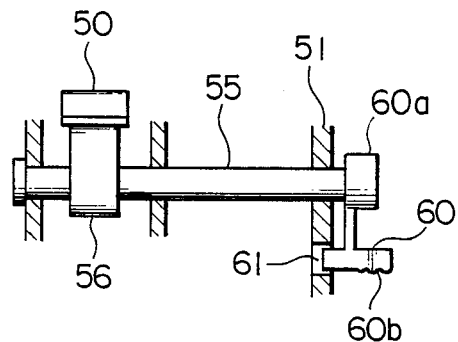
FIG. 3 (A) represents an example of a pad pressure adjusting means in a lengthwise cross-sectional view.
Figure 3B:
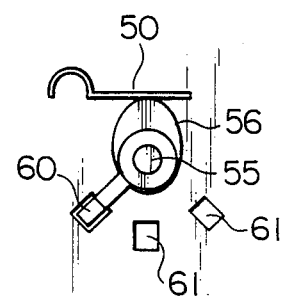

This adjusting cam 56 is connected to an adjusting means provided on the exterior of the casing 2. FIGS. 3(A) and 3(B) illustrate an example of an adjusting means for this purpose, which consists of a handle 60 connected with the rotary shaft 55 of the adjusting cam 56. An adjusting handle 60 of this kind may be formed of an elastic material such as a plastic and in the shape of the letter T, and attached at one end 60a to the cam shaft 55 so that by turning this adjusting handle 60 the pad pressure adjusting cam 56 can be turned correspondingly with the turning motion conveyed by the cam shaft 55.

The rotary cam shaft 55 is held by a fixed support 51, which may be a part of the casing 2 or a plate provided inside the casing 2.

Whereas the pressure from the intermediary spring 50, may enable said adjusting handle 60 to remain stationary at a position of adjustment without the help of a catch, a click as described next may be introduced with advantage. In FIGS. 3(A) and 3(B), the casing 2 is shown to have a plurality of through holes 61, into which one end 60b of the adjusting handle 60 is elastically fitted in order to maintain the pressure which the adjusting cam 56 exerts upon the intermediary spring 50.

When this pressure from the adjusting cam 56 acting upon the intermediary spring 50 is required to be changed, the end 60b of the adjusting handle 60 is pushed upward and pulled out of the hole 61 while thus being pushed and then brought to the appropriate position by turning the adjusting handle 60, where it is fitted into the hole 61. Thus the pressure exerted by the adjusting cam 56 upon the intermediary spring 50 can be changed stepwise.

Figure 4A:
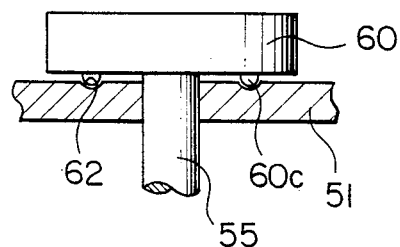
FIG. 4 (A) represents another example of a pad pressure adjusting means in a cross-sectional view.
Figure 4B:
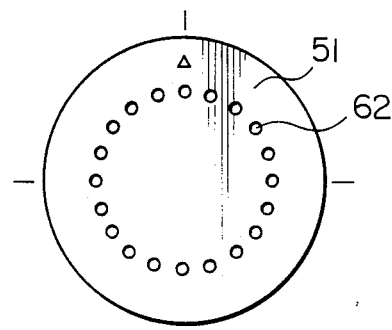

FIGS. 4 (A) and (B) illustrate another example of a pad pressure adjusting means 60. This adjusting means consists of a disk 60 whose underside has one or more protrusions 60c which are designed to fit elastically into a plurality of pits 62 formed in a fixed support 51 so that the pad pressure can be adjusted by turning the disk 60. The disk 60 can be unlocked and locked elastically when the pad pressure is thus adjusted. Where a plurality of pad pressure adjusting disks 60 are provided, the pad pressure can be adjusted almost in a continuous gradient.

Figure 5A:
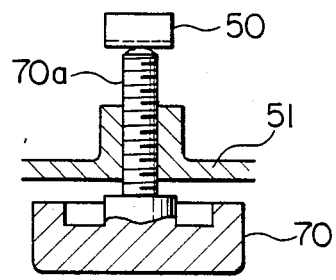
FIG. 5 (A) represents an example of a screw type pad pressure adjusting means in a cross-sectional view.
Figure 5B:
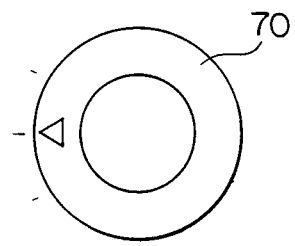
Figure 6:
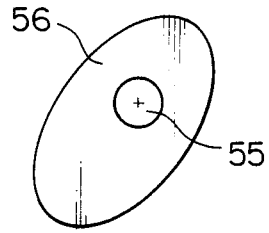
FIGS. 6 and 7 respectively illustrate examples of pad pressure adjusting cams in this invention, each in a planar view.

FIGS. 5(A) and 5(B) illustrate an example of a pad pressure adjusting means, which is in the form of a adjusting thumbscrew 70 and designed to directly press against the intermediary spring 50 without using an adjusting cam 56. This adjusting thumbscrew 70 has the shape of the letter T in a side view and one 70a of its ends is threaeded. This threaded end 70a is fitted into a threaded hole 2a formed in a fixed support 51 or the casing 2. With the end 70a of the adjusting thumbscrew 70 directly pressing against the intermediary spring 50, the pad pressure can be adjusted by turning the top of the adjusting thumbscrew 70.

A pad pressure adjusting mechanism based on such an adjusting screw 70 permits the pad pressure to be adjusted in a continuous gradient.

The introduction of a pad pressure adjusting means 60 or 70 as described above makes it possible to adjust the pad pressure to most favorably suit the thickness and the quality of each sheet of paper 19 used so that a failure in separating each sheet from the rest, such as an overlapping of paper sheets, can be precluded from the forwarding operation of messages. When the paper is thin or lacks stiffness, the pad pressure can be increased to suit the particular quality.

When the pad pressure adjusting cam 56 used is oval in shape, as shown in FIG. 3, the pad pressure can be adjusted in a continuous gradient.

Figure 7:
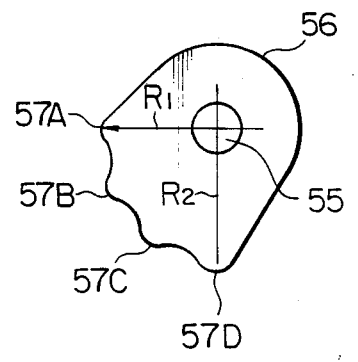
Figure 8:
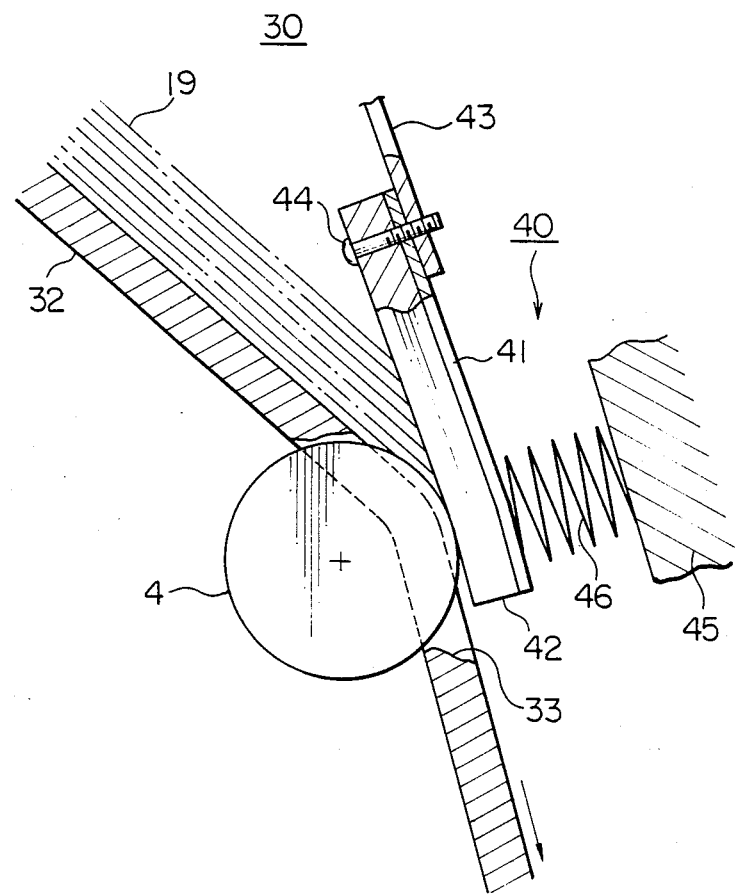
FIG. 8 represents an example of an automatic paper feed device in the prior art in a cross-sectional side view.

FIG. 7 illustrates another example of a pad pressure adjusting cam 56, which juts out at a plurality of peripheral points with mutually different radii, forming cam vertices 57i (i is an integer). In this example, the radius increases in the order of the cam vertices from 57A to 57D.

The example of FIG. 7 has four cam vertices 57A through 57D, which together are designed to change the pad pressure to three different degrees. For example, compared with the pad pressure acting with the cam vertices 57A and 57B pressing against the leaf spring 41, the pad pressure acting upon the document feed rollers 4 with the cam vertices 57C and 57D on the same leaf spring is greater in proportion to the increased radius R2.

Whereas the pad pressure adjusting means can be provided literally on the exterior of the casing 2 as mentioned hereinbefore, it may as well be installed at the part 101 of the casing under the lid 100, which is shown in FIG. 1.

A pad pressure adjusting thumbscrew 70, as shown in FIG. 5, can be employed in an automatic paper feed device in the prior art, since it does not require an adjusting cam 56 to be used in conjunction therewith. In such a case the end 70a of the adjusting thumbscrew 70 may directly presss against the coil spring 46. Advantages of the invention are as follows.

As will have become clear from the foregoing description, a pad pressure adjusting mechanism embodying this invention is equipped specially with an adjusting means at an exterior position, which enables an operator to adjust the pad pressure from the outside of the apparatus. With this mechanism, the pad pressure acting upon the document feed rollers can be adjusted from the outside stepwise or in a continuous gradient.

By virtue of this invention the pad pressure can, at all times, be adpated most favorably to the thickness and the quality of the paper used so that problems such as that of an overlapping of paper sheets, which might otherwise results from changes in thickness or quality of the paper, can be precluded from the operation.

It is very simple to adjust the pad pressure, since it can be adjusted from the outside of the apparatus.

A pad pressure adjusting mechanism of this invention permits paper of any thickness to be used without invovling overlapping of two or more sheets.

Accordingly, this invention is applicable to the automatic paper feed device in a facsimile machine with great advantage.

A detailed description of automatic paper feed device embodying another example of the present invention will be explained as follows.

Figure 9:
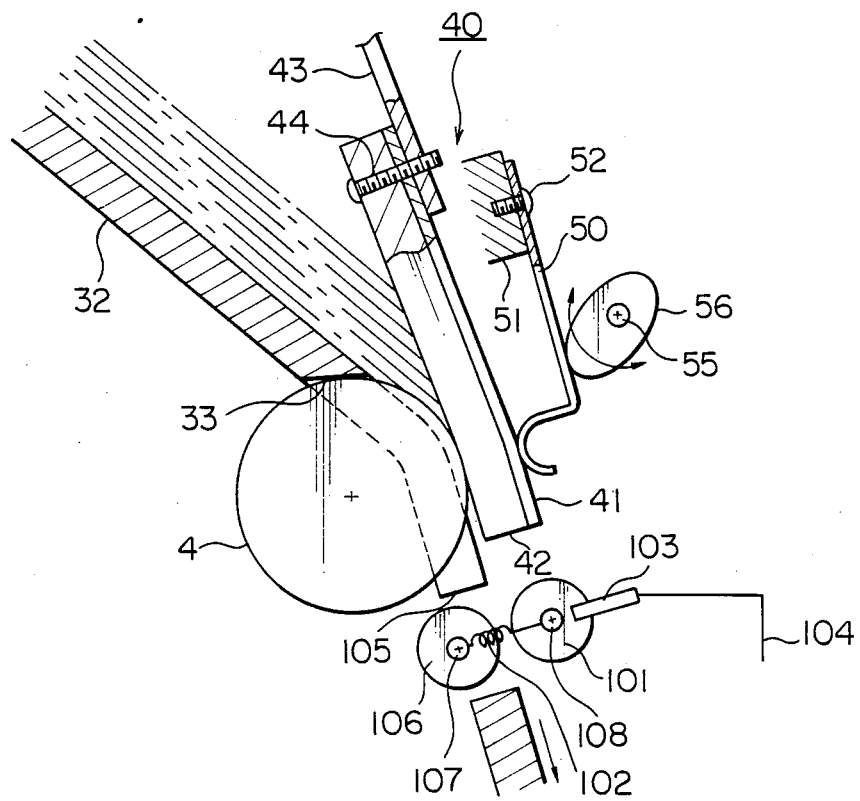
FIG. 9 represents another example of an automatic paper feed apparatus embodying the present invention, illustrating its main structure in a side view.

FIG. 9 represents one of the examples of an automatic paper feed apparatus embodying the present invention, illustrating its main structure in a side view.

As FIG. 9 shows, a cutout 105 is installed in the guide plate 32 right behind the feed roller 4. In other words, the numeral 105 in the drawing indicates a cutout which is opened in the guide plate 32. A pair of rollers, one is a stationary roller 106 and the other is a movable roller 101, are installed in the cutout.

The position of the stationary roller is fixed in a position where the circumferential surface accords with the path line of a document paper to be transported by the feed rollers 4. The stationary roller 106 is driven by a motor which is not shown in the drawing, and rotates to carry a document paper sent from the feed rollers 4.

The movable roller 101 can move upwards and downwards with regard to the stationary roller 106. The direction of the movement of the movable roller 101 is rectangular to the above-mentioned path line.

The function of these rollers is to measure accurately the thickness of the document sheet to pass through between two rollers. The shaft 107 of the stationary roller 106 and the shaft 108 of the movable roller 101 are tied by the helical spring 102 and the movable roller 101 is drawn toward the stationary roller 106. As a result, the document paper which passes between the two rollers is pinched tightly by those rollers while it is transported to the direction as indicated by an arrow in the drawing.

Figure 10:
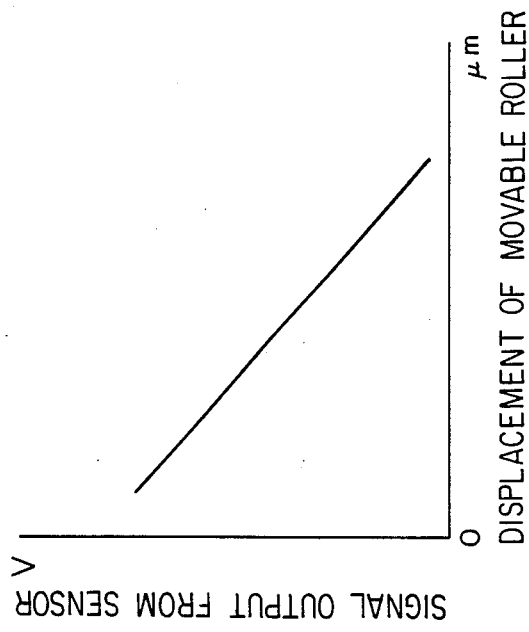
FIG. 10 represents a chart which shows the relationship between the displacement of the movable roller of this invention and the signal voltage which is output from the sensor.

The movable roller 101 is equipped with a microdisplacement sensor 103 and displacement of the movable roller 101 is converted to an electric signal which is transmitted by the wiring 104 to an amplifier that is not shown in the drawing. FIG. 10 shows the relationship between displacement of the movable roller and an electric signal voltage output from the sensor 103.

Figure 11:
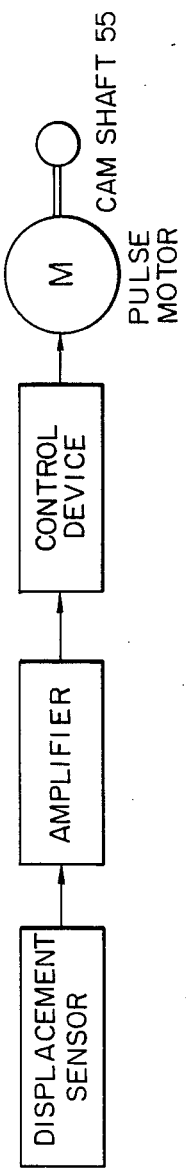
FIG. 11 represents a schematic block diagram which shows the means for controlling the angle of rotation of the cam shaft 55 automatically.

When the thickness of a document paper changes, the movable roller 101 moves according to the displacement of the thickness of the paper and microdisplacement sensor 103 detects it to send an electric signal to the amplifier. FIG. 11 represents a schematic block diagram concerning this matter. As the diagram 11 shows, the electric signal from the microdisplacement sensor is sent to the control device through the amplifier. The pulse motor whose drive shaft is connected with the cam shaft 55 is controlled by the control device according to the electric signal sent from the displacement sensor 103 through the amplifier and the control device. In this way, the rotation of the cam shaft 55 is automatically controlled according to the displacement of the thickness of a document paper which passes through between the stationary roller 106 and the movable roller 101. As a result, the pressing force of the separating pad 42 against the feed rollers 4 is automatically kept proper to feed document sheets smoothly.

Figure 12:
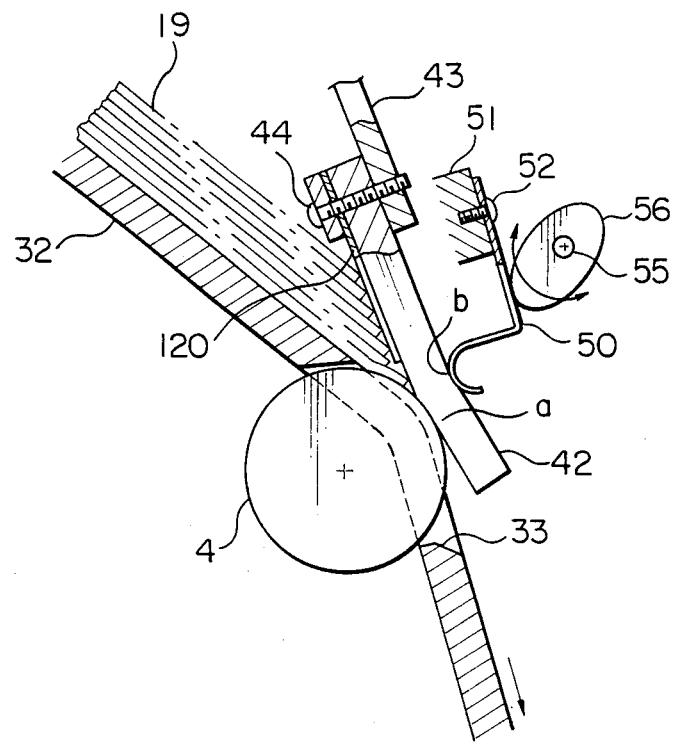
FIG. 12 represents another example of an automatic paper feed apparatus embodying this invention, illustrating its main structure in a side view.

In another embodiment of the present invention, a sliding plate is used in an automatic paper feed device. FIG. 12 represents one of the examples of an automatic paper feed appratus in which a sliding plate is installed.

In FIG. 12, a sliding plate 120 with an adequate shape is mounted on the separating pad 42. The sliding plate is mounted on the side where it comes into contact with the leading parts of document papers piled on the quide plate 32. In this example, the width of the sliding plate 120 is the same with that of the separating pad 42. The length of the sliding plate is a little shorter than that of the separating pad. The thickness of the sliding plate is from 0.1 mm to 0.2 mm.

The materials are polypropylene, polyethylene and another kinds of resins. In the case that the sliding plate 120 is made from resin, the surface of it becomes slippery and its contact resistance is very small.

The sliding plate 120 is installed on the separating pad 42 by screws 44 and the like so as to keep the leading part of it in the vicinity of the contact point 'a' which is shown in the drawing 12.

To be more specific, the sliding plate is mounted so as to place its leading part 1 mm or 2 mm on the side of the contact point 'a'. The sliding plate 120 can be stuck to the separating pad 42 with an adhesive agent.

In the case that the separating pad 42 is made as mentioned above, when a lot of document sheets 19 are piled on the document sheet stand 3, the condition of the leading parts of document sheets is shown in FIG. 12. Leading parts of most of the piled document sheets 19 come into contact with the sliding plate 120. As a result, when the first document sheet placed at the bottom of the pile if separated from the pile and fed by the feed roller 4, the rest document sheets which contact with the sliding plate 120 slide into the side of contact point 'a' smoothly one by one. In other words, the surface of the sliding plate 120 is slippery, so document sheets at the upper part of the pile slip downward on the surface of the sliding plate 102, starting with the leading parts of document sheets, together with document sheets at the bottom part of the pile.

As a result, even if the separating pad force against the feed roller 4 is increased to a certain degree, document sheets at the upper part of the pile drop into the contact point 'a' side smoothly, so failure of document sheet feeding never occurs and furthermore document sheets are separated and fed without double feeding.

The shape and materials of the sliding plate 120 are not limited to the above-mentioned ones. Other shape and materials can be used if they do not have a bad influence on separating efficiency of the separating pad 42. But the sliding plate 120 surface which comes into contact with document sheets must be slippery even in that case.

What is claimed is:

1. An automatic document feed apparatus, comprising:
   (a) a separation pad;
   (b) at least one feed roller which comes into slidable contact with said separation pad, said roller being driven and transporting a sheet of document pinched between said roller and said pad; and
   (c) means for adjusting the force pressing said pad against said roller, including a spring backing said pad and a rotary cam mechanism in pressing engagement with said spring for adjusting the spring force.

2. The automatic document feed apparatus as set forth in claim 1, wherein said cam mechanism is automatically operated according to a signal sent from a document paper thickness measure device installed in said automatic document feed apparatus.

3. The automatic document feed apparatus as set forth in claim 1, wherein a sliding plate is mounted on one side of said separation pad, so as to be into slidable contact with the leading part of said document sheet to be fed by said feed roller.

4. The automatic document feed apparatus of claim 1, further comprising a handle having an axially extending portion and movable with the cam mechanism, and a plurality of arcuately spaced aperture means disposed to selectively receive the axially extending handle portion for incrementally fixing the cam mechanism in a selected position.

5. The automatic document feed apparatus of claim 1, further comprising a disc fixed to and rotatable with the cam mechanism said disc having a radial surface adjacent a fixed planar surface, said radial and fixed surfaces having arcuately spaced projections and cooperating detents disposed to fix the disc in a selected angular position for incrementally fixing the cam mechanism in a selected position.

* * * * *